(12) United States Patent
Wang et al.

(10) Patent No.: US 9,639,583 B2
(45) Date of Patent: May 2, 2017

(54) CACHING PREDEFINED DATA FOR MOBILE DASHBOARD

(71) Applicants: Zheng Wang, Shanghai (CN); Zhiyong Gong, Shanghai (CN)

(72) Inventors: Zheng Wang, Shanghai (CN); Zhiyong Gong, Shanghai (CN)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 467 days.

(21) Appl. No.: 14/252,656

(22) Filed: Apr. 14, 2014

(65) Prior Publication Data

US 2015/0296040 A1      Oct. 15, 2015

(51) Int. Cl.
*G06F 17/30* (2006.01)
*H04L 29/08* (2006.01)

(52) U.S. Cl.
CPC .... *G06F 17/30554* (2013.01); *H04L 67/2857* (2013.01)

(58) Field of Classification Search
CPC ................................................ G06F 17/30554
See application file for complete search history.

(56) References Cited

U.S. PATENT DOCUMENTS

| | | | |
|---|---|---|---|
| 8,065,618 B2 * | 11/2011 | Kumar | G06F 3/0481 715/704 |
| 8,566,193 B2 | 10/2013 | Singh et al. | |
| 8,788,458 B2 | 7/2014 | Waterman et al. | |
| 9,240,061 B2 * | 1/2016 | Breedvelt-Schouten | G06T 11/20 |
| 9,280,443 B2 * | 3/2016 | Che | G06F 11/3612 |
| 2004/0098462 A1 * | 5/2004 | Horvitz | G05B 19/404 709/207 |
| 2005/0091226 A1 | 4/2005 | Lin et al. | |
| 2006/0277277 A1 | 12/2006 | Landschaft et al. | |
| 2007/0059441 A1 * | 3/2007 | Greer | E01F 9/512 427/136 |

(Continued)

OTHER PUBLICATIONS

From Tableau Software, entitled "Visual Analytics for Everyone," printed and downloaded on Apr. 14, 2014.

(Continued)

*Primary Examiner* — Lashonda Jacobs
(74) *Attorney, Agent, or Firm* — Fountainhead Law Group P.C.

(57) ABSTRACT

Embodiments provide a data caching mechanism based on a user's request (query) to a remote database, and the corresponding response (query result) received therefrom. As part of a database query, the user can define cache parameter(s). When a viable communications link becomes available to access the remote database, volumes of relevant data are returned as a query result and cached locally according to those predefined cache parameter(s). Embodiments are particularly suited to allow a mobile device to interact with data of a remote database in an efficient and reliable manner. The mobile device's small form factor, may preclude local storage of large volumes of remotely stored data. However, this can be compensated for by selectively storing data in the cache memory according to user-specified parameters, allowing the mobile device to continue to have access to relevant information in the event that communication with the remote database is degraded or lost.

19 Claims, 9 Drawing Sheets

(56) References Cited

U.S. PATENT DOCUMENTS

| | | | |
|---|---|---|---|
| 2007/0067373 A1 | 3/2007 | Higgins et al. | |
| 2007/0101284 A1* | 5/2007 | Shaw | G06Q 10/107 715/772 |
| 2008/0168367 A1 | 7/2008 | Chaudhri et al. | |
| 2008/0209078 A1* | 8/2008 | Bates | G06Q 10/00 710/10 |
| 2009/0055467 A1* | 2/2009 | Petersen | H04L 67/1095 709/203 |
| 2011/0004627 A1* | 1/2011 | Reca | G06Q 10/06 707/778 |
| 2011/0209052 A1* | 8/2011 | Parker | G06F 3/0483 715/255 |
| 2012/0041990 A1* | 2/2012 | Kreindlina | G06F 17/30572 707/805 |
| 2012/0089902 A1 | 4/2012 | Sheflin | |
| 2012/0123989 A1* | 5/2012 | Yu | G06Q 10/0639 706/47 |
| 2012/0226626 A1* | 9/2012 | Venkateswaran | G06Q 10/06 705/342 |
| 2012/0278365 A1* | 11/2012 | Labat | G06Q 10/06 707/798 |
| 2012/0296930 A1* | 11/2012 | Lewak | G06F 17/3048 707/769 |
| 2013/0143587 A1* | 6/2013 | Williams | H04W 4/023 455/456.1 |
| 2013/0167072 A1 | 6/2013 | Ari et al. | |
| 2013/0227112 A1 | 8/2013 | Lehmann et al. | |
| 2013/0246130 A1* | 9/2013 | Michel | G06Q 10/067 705/7.36 |
| 2013/0246445 A1 | 9/2013 | Tobin et al. | |
| 2013/0275890 A1 | 10/2013 | Caron et al. | |
| 2013/0297588 A1* | 11/2013 | Tyagi | G06Q 10/06 707/722 |
| 2014/0067407 A1* | 3/2014 | Sathe | G06Q 50/22 705/2 |
| 2014/0075345 A1 | 3/2014 | Fippel | |
| 2014/0082534 A1* | 3/2014 | Cleron | G06F 3/04883 715/764 |
| 2014/0095543 A1* | 4/2014 | Hsiao | G06F 17/30442 707/779 |
| 2014/0280383 A1* | 9/2014 | Douglas | G06F 17/30507 707/812 |
| 2014/0282046 A1* | 9/2014 | Gonsalves | G06F 11/0709 715/740 |
| 2014/0351708 A1* | 11/2014 | Balasubramanyan | G06F 3/048 715/745 |
| 2015/0039745 A1* | 2/2015 | Degioanni | H04L 43/045 709/224 |
| 2015/0180933 A1* | 6/2015 | Spracklen | G06F 17/246 715/740 |
| 2015/0332200 A1* | 11/2015 | Bernaudin | G06F 3/0481 705/7.42 |
| 2015/0358391 A1* | 12/2015 | Moon | H04L 67/10 709/224 |

OTHER PUBLICATIONS

Dashboards and Presentation Design User Guide—SAP Business Objects 4.0 Feature Pack 3, Mar. 15, 2012.
Question "Error in viewing a flash snapshot of dashboard via BI Launch Pad", by Rica Marapao, dated Nov. 15, 2011.
From Datazen, Internet article "Dashboards and Scorecards," downloaded from www.datazen.com. downloaded and printed on Apr. 14, 2014.
Martin Hu, from Smart eVision International, Inc., "Mobile Technique and Features," Smart eVision White Paper, Oct. 16, 2013.
Kai Poon, "Creating your First Smart eVision Mobile Dashboard," downloaded and printed on Apr. 14, 2014.

* cited by examiner

```xml
<CacheDescription>
  <Cache type="SingleValueAnswer">
    <answerValue>
      <keyField value="1" type="Double"/>
      <captionField value="USA" type="String"/>
    </answerValue>
  </Cache>
  <Cache type="SingleValueAnswer">
    <answerValue>
      <keyField value="2" type="Double"/>
      <captionField value="Canada" type="String"/>
    </answerValue>
  </Cache>
</CacheDescription>
```

CACHING PREDEFINED DATA FOR MOBILE DASHBOARD

BACKGROUND

Embodiments of the present invention relate to accessing database data. Particular embodiments provide methods and apparatuses that cache predefined data for a mobile dashboard.

Unless otherwise indicated herein, the approaches described in this section are not prior art to the claims in this application and are not admitted to be prior art by inclusion in this section.

Data stored in large databases, are increasingly being accessed and manipulated by mobile devices. Such usage scenarios can offer certain challenges.

One challenge is the limited storage capacity of the mobile device. In particular, characteristics (e.g. small size, light weight) of the portable form factor of the mobile device, may likely preclude local storage of the entirety of the large data volumes that are available on a database.

A typical consequence of this challenge, is that mobile devices conventionally store only some small fragment of the data in the database. The database itself remains stored remotely on a server, accessed by the mobile device through an active, high quality communication link.

Certain conventional approaches may locally store on the mobile device, only that specific data necessary for display according to a current dashboard view. Access to data not present in that particular view (e.g. as may be called for by changing display views or issuing a different but related query), requires the mobile device to reach out and contact the remote server in order to access the full database.

This in turn leads to a second challenge. Namely, it can be difficult to ensure a constant, active, high quality communications link between the mobile device and the remote server. In particular, while wireless network access is increasingly available over large geographic areas, the quality and speed of the communications link can vary widely (e.g. between 2G-4G). In some instances, the existence of a viable communications link itself, is not guaranteed.

The loss or deterioration in quality of such an active network connection, can hinder the free access by a user to the data of the database. In particular, the mobile device (and the user) may be unable to access relevant information stored remotely in the database.

Accordingly, the present disclosure addresses these challenges with methods and apparatuses that cache predefined data for a mobile dashboard.

SUMMARY

Embodiments provide a data caching mechanism based on a user's request (query) to a remote database, and the corresponding response (query result) received therefrom. As part of a database query, the user can define cache parameter(s). When a viable communications link becomes available to access the remote database, volumes of relevant data are returned as a query result and cached locally according to those predefined cache parameter(s). Embodiments are particularly suited to allow a mobile device to interact with data of a remote database in an efficient and reliable manner. The mobile device's small form factor, may preclude local storage of large volumes of remotely stored data. However, this can be compensated for by selectively storing data in the cache memory according to user-specified parameters, allowing the mobile device to continue to have access to relevant information in the event that communication with the remote database is degraded or lost.

An embodiment of a computer-implemented method comprises providing a device comprising a cache engine and a cache memory, causing the cache engine to communicate a query including a cache parameter over a network connection to a remote database, and causing the cache engine to receive a query result over the network connection. The cache engine is caused to store in the cache memory according to the cache parameter, data of the query result. The device is caused to display to a user, a dashboard including the data of the query result stored in the cache memory.

An embodiment of a non-transitory computer readable storage medium embodies a computer program for performing a method comprising providing a device comprising a cache engine and a cache memory, causing the cache engine to communicate a query including a cache parameter over a network connection to a remote database, and causing the cache engine to receive a query result over the network connection. The cache engine is caused to store in the cache memory according to the cache parameter, data of the query result. The device is caused to display to a user, a dashboard including the data of the query result stored in the cache memory.

An embodiment of a computer system comprises one or more processors and a software program executable on said computer system. The software program is configured to provide a device comprising a cache engine and a cache memory, to cause the cache engine to communicate a query including a cache parameter over a network connection to a remote database, and to cause the cache engine to receive a query result over the network connection. The software program is configured to cause the cache engine to store in the cache memory according to the cache parameter, data of the query result. The software program is configured to cause the device to display to a user, a dashboard including the data of the query result stored in the cache memory.

In certain embodiments the device comprises a mobile device.

In some embodiments the dashboard displays the data of the query result stored in the cache memory when the network connection is unavailable.

Particular embodiments may further comprise offering the cache parameter for selection by the user.

In various embodiments the cache parameter comprises a data size limitation.

According to certain embodiments the cache parameter comprises a temporal limitation.

In some embodiments the cache parameter comprises a magnitude limitation.

The following detailed description and accompanying drawings provide a better understanding of the nature and advantages of particular embodiments.

DETAILED DESCRIPTION

Described herein are techniques allowing caching of predefined data for a mobile dashboard. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments provide a data caching mechanism based on a user's request (query) to a remote database, and the corresponding response (query result) received therefrom. As part of a database query, the user can define cache parameter(s). When a viable communications link becomes available to access the remote database, volumes of relevant data are returned as a query result and cached locally according to those predefined cache parameter(s). Embodiments are particularly suited to allow a mobile device to interact with data of a remote database in an efficient and reliable manner. The mobile device's small form factor, may preclude local storage of large volumes of remotely stored data. However, this can be compensated for by selectively storing data in the cache memory according to user-specified parameters, allowing the mobile device to continue to have access to relevant information in the event that communication with the remote database is degraded or lost.

Figure 1:
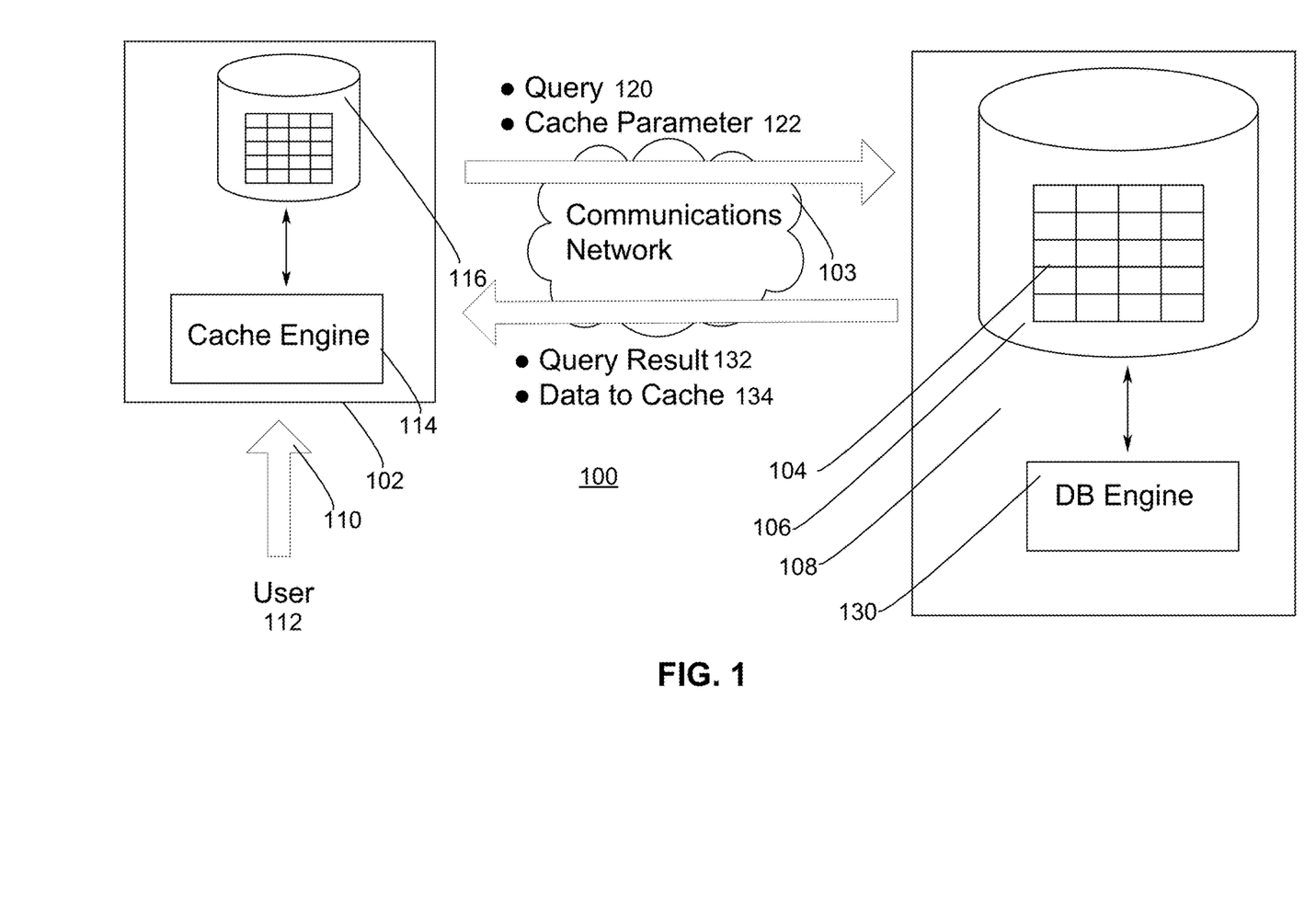
FIG. 1 shows a simplified view of a system according to an embodiment.

FIG. 1 is a simplified view of a system 100 according to an embodiment. In particular, mobile device 102 is in communication via a wireless network 103, with a database 104 hosted on a non-transitory computer-readable storage medium 106 of remote server 108. The mobile device is also configured to receive input 110, for example a database query, from a user 112.

The mobile device includes a caching engine 114 (also herein cache engine) that is configured to govern the storage of information in cache memory 116 of the mobile device. In particular, based upon user input defining a database query 120 and a cache parameter 122, the caching engine will communicate with a database engine 130 of the remote server 108, to retrieve database information comprising a query result 132 and data to be cached 134, from the remote database.

Upon return of database data from the remote server through the wireless network, the caching engine will locally store the data to be cached 134 in the cache memory of the mobile device. In this manner certain data of the database is made available to the user, even if the communications link via the network is degraded or lost.

Figure 1A:
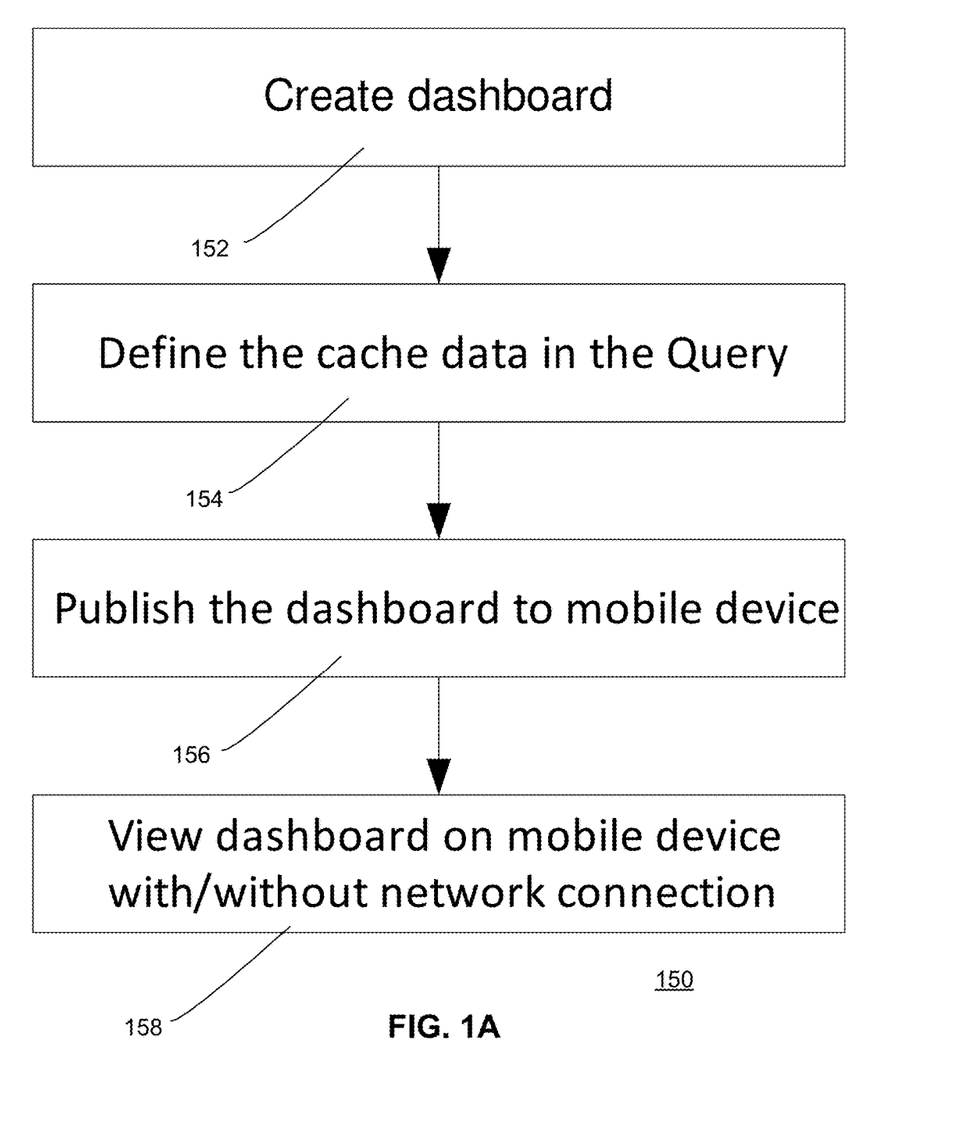
FIG. 1A is a simplified flow diagram illustrating steps of a method according to an embodiment.

FIG. 1A is a simplified flow diagram illustrating steps of a method 150 according to an embodiment. In a first step 152, a dashboard for displaying database data is created on the mobile device.

In a second step 154, the data to be stored in the local cache memory of the mobile device, is defined. This definition of cache parameter(s) may take occur by the dashboard graphic use interface (GUI) offering to the user, options to select in a menu. One example of such a menu may be a drop-down box.

In a third step 156, the data to be displayed on the dashboard is retrieved and published to the mobile device. In a fourth step 158, a user may view the dashboard on the mobile device, with or even without a network connection.

Figure 1B:
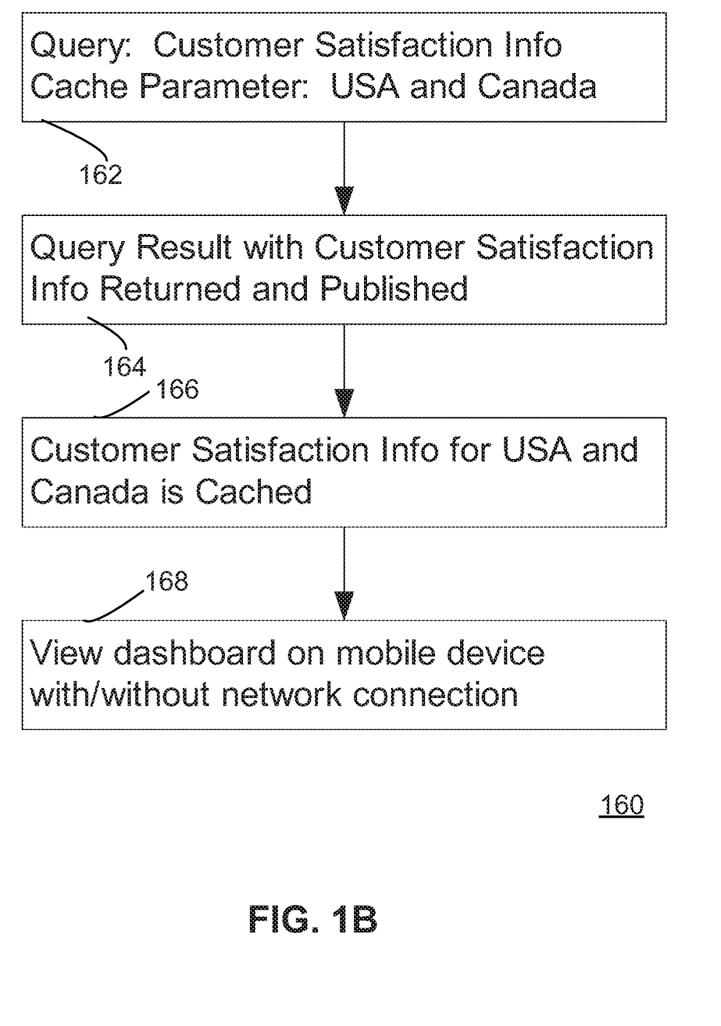
FIG. 1B is a simplified flow diagram illustrating steps of one specific example of a method according to an embodiment.

FIG. 1B is a simplified flow diagram illustrating steps of one specific example of a method 160 according to an embodiment. In a first step 162, a mobile device user formulates query to a remote database requesting customer satisfaction information. The user specifies as a cache parameter, the countries of USA and Canada.

In a second step 164, the query result is returned over the viable network connection and published on the dashboard of the mobile device. In a third step 166, customer satisfaction information for the USA and for Canada is stored by the cache engine in the local cache memory of the mobile device according to the cache parameter. In a fourth step 168, the mobile device's user may view the dashboard including the cached customer satisfaction information of the USA and Canada, with or without a viable network connection.

While FIG. 1B shows operation with a cache parameter specifying a particular country, embodiments are not limited to this specific instance. A cache parameter may specify a large variety of different properties in order to determine the database data that is to be stored locally in a memory of a mobile device.

Examples of characteristics that could be specified by a cache parameter can include virtually any aspect of the database query, including but not limited to:

a database row;
a database column;
a database table;
a geographic limitation (e.g. data in a particular region);
a temporal limitation (e.g. data over a particular time period);
a source limitation (e.g. data from a particular source);
a magnitude limitation (e.g. data lying within a particular magnitude range);
data located in a particular field in the GUI;
data included in a particular view, or present within a specific display format (e.g. table, plot, map, chart, animation, etc.) of a particular view;
data involved in particular database operations (e.g. aggregation, grouping, sorting, filtering, others);
a data size limitation (e.g. an amount of data not exceeding a certain volume, in order to avoid exceeding the available capacity of the mobile device cache memory); and
others.

Embodiments as described herein are not limited to use with any particular data visualization tool, information database, or mobile device. Examples of particular data visualization applications with which embodiments could be implemented, may include but are not limited to the LUMIRA platform available from SAP AG of Walldorf, Germany, the BUSINESSOBJECTS DESIGN STUDIO also available from SAP AG, TABLEAU available from Tableau Software of Seattle, Wash., and various visualization tools available from Microstrategy of Tysons Corner, Va. Still another possible suitable visualization tool is now described below in connection with the following specific example.

Example

The BUSINESSOBJECTS DASHBOARDS software available from SAP AG of Walldorf, Germany, comprises a visualization tool for creating an interactive dashboard. This dashboard may be based on high-level and aggregated data sets, and it can be used with mobile devices.

The dashboard offline support, is the ability to cache and store the dashboard content and data for use when offline. For example, in an off-site meeting at a location with unreliable network connectivity, a sales manager would like to show the data for USA and Canada for the global sales director.

Accordingly, the sales manager formulates a query to select sales for a specified country in dashboard. The sales manager specifies the USA and Canada as the cache countries parameter.

As soon as a wireless network connection becomes available to the mobile device, the dashboard will automatically cache the data for these two counties. This allows customer satisfaction information relating to the USA and Canada to be accessible offline, even if the network connection deteriorates or is lost entirely.

Utilizing the SAP BUSINESSOBJECTS DASHBOARDS data visualization tool, the dashboard user can perform one or more of the following. The user can create a dashboard and formulate queries to connect to a backend data base. The user can define the cache data for each query. The user can publish the dashboard to a mobile device (for example an iPad available from Apple Computer of Cupertino, Calif.). Using the mobile device, the dashboard user can then view the dashboard even without a network connection.

Figure 2:
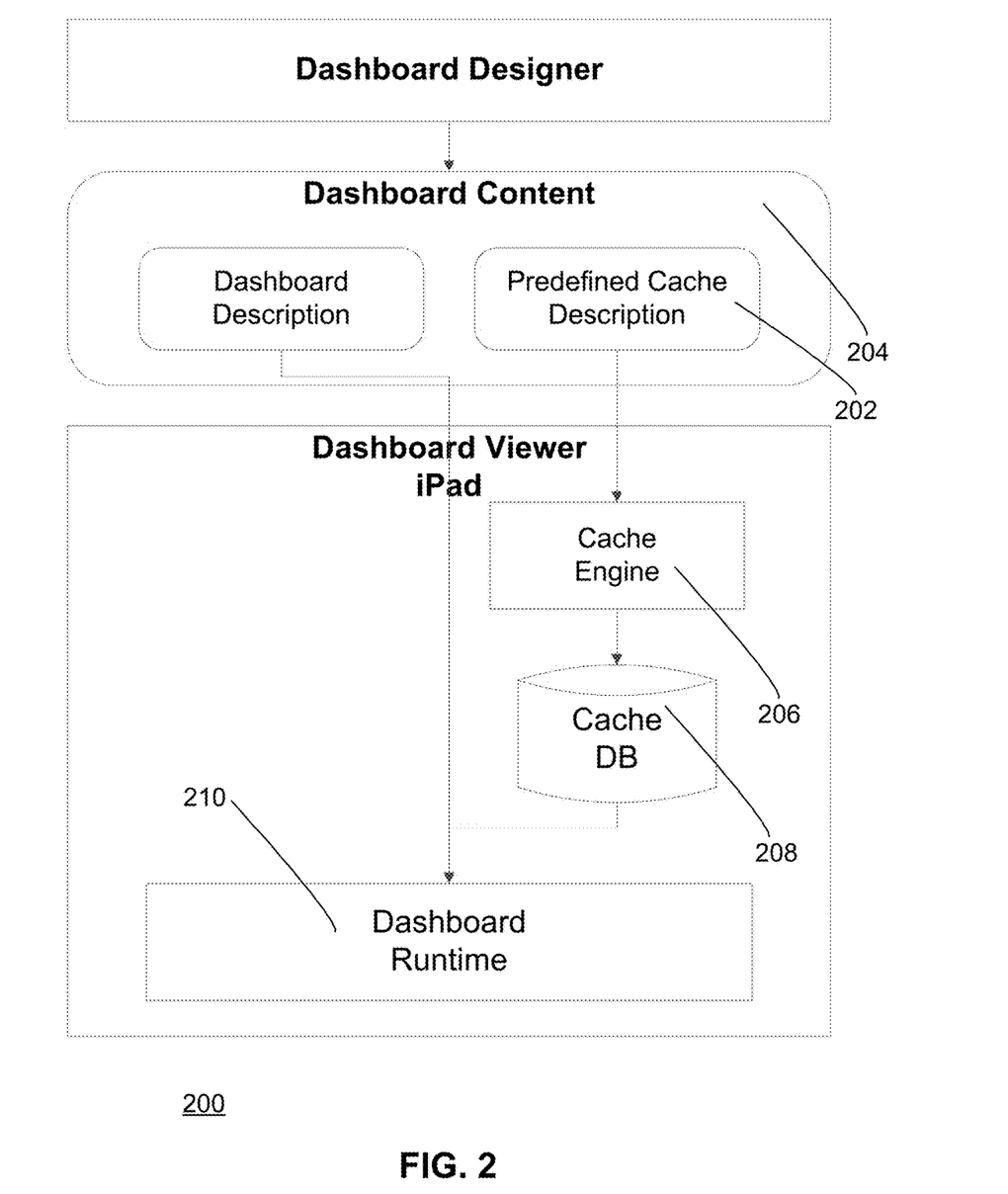
FIG. 2 shows an overall architecture for one particular embodiment of a cache predefined data mechanism.

Certain embodiments may be implemented as follows. FIG. 2 shows an overall architecture 200 for an embodiment of a cache predefined data mechanism, comprising three modules.

The predefined cache description 202 may comprise XML data defining which data will be cached. The predefined cache description may be saved to dashboard content 204 when the design is complete.

Figure 3:
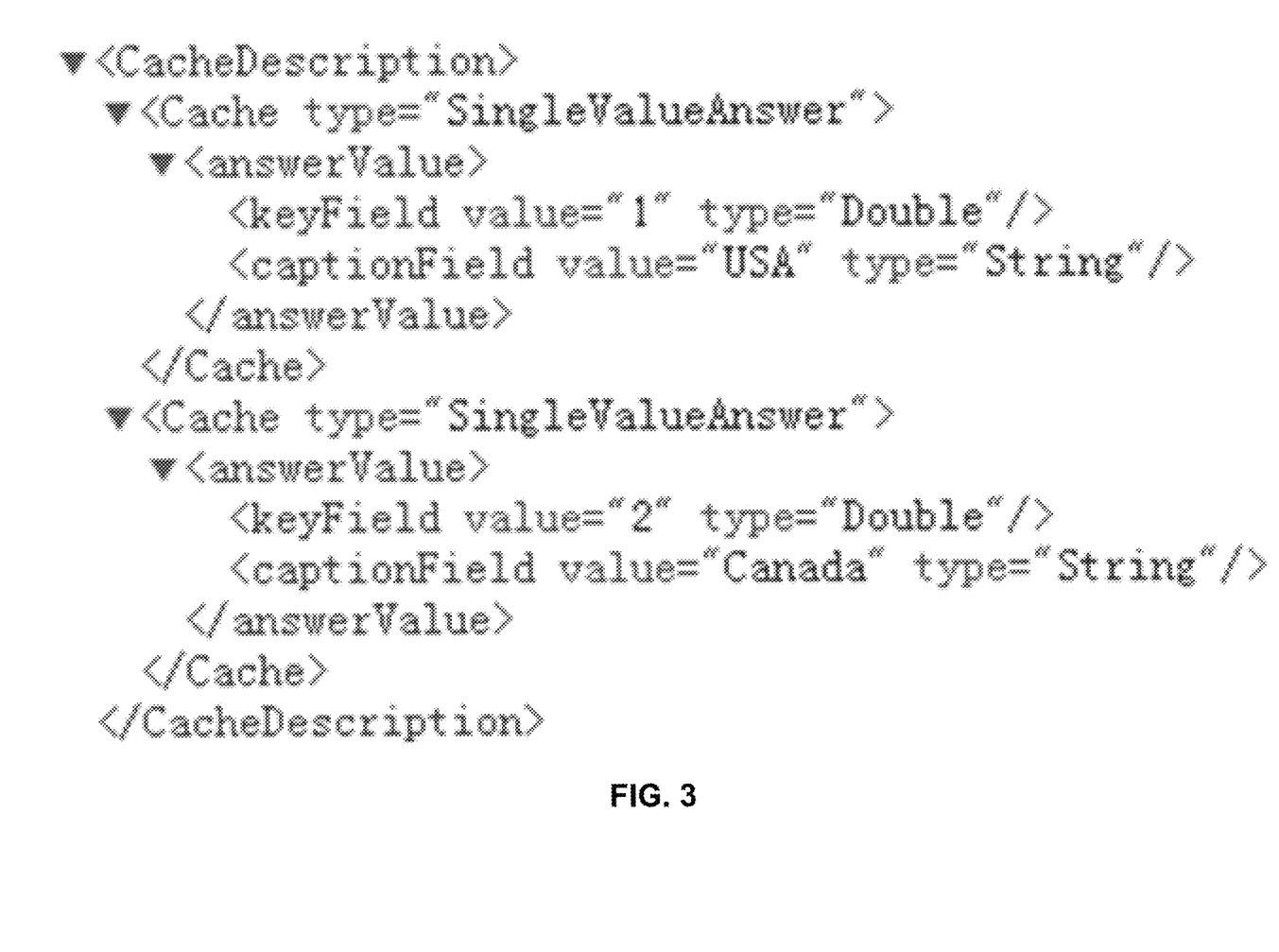
FIG. 3 shows a sample of one particular predefined cache description.

The predefined cache description may comprise an XML description including request information. So the "Cache Engine" could use these requests to query the responses. FIG. 3 is a sample of one "Predefined Cache Description" which includes answer type, key field and caption field. This particular predefined cache description allows a user of a mobile device to specify a country.

A second module of FIG. 2 comprises the cache engine 206. The cache engine will send a request (e.g. database query) by the predefined cache description. The cache engine may then save a corresponding response (e.g. query result) to the cache database (DB) 208. The cache DB will save cached responses. This will occur when a viable communications link is available to download dashboard content to the iPad.

Figure 4:
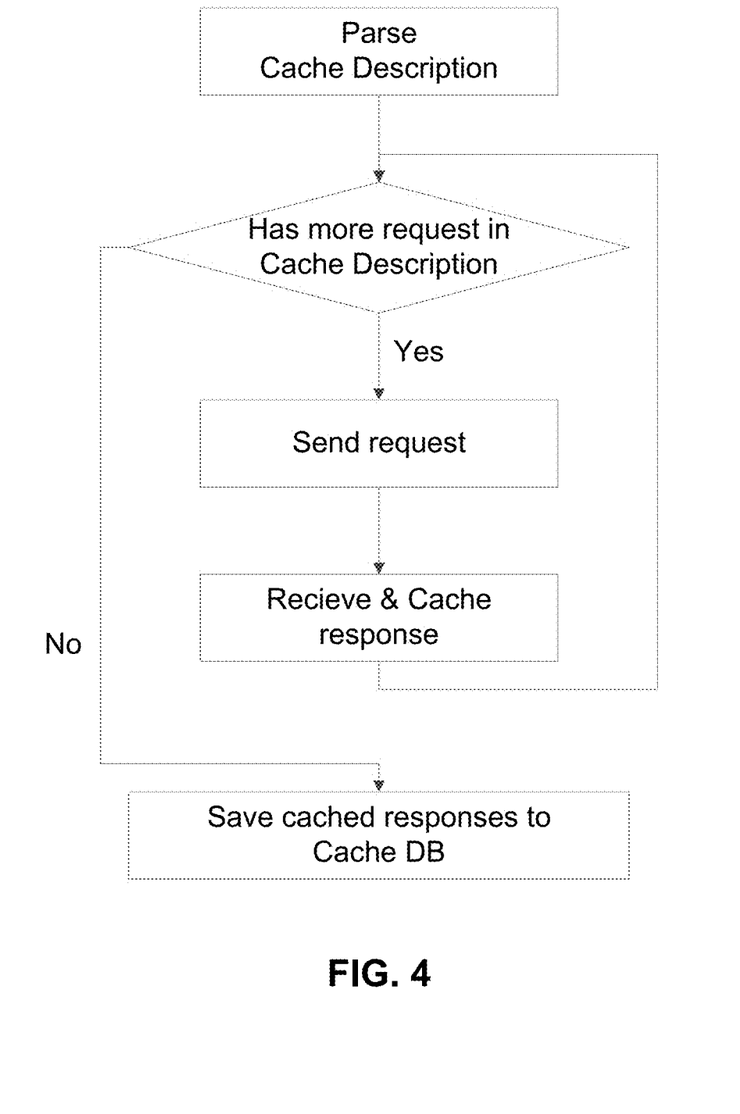
FIG. 4 illustrates a cache engine workflow according to an embodiment.

FIG. 4 illustrates a cache engine workflow. The cache engine performs several tasks.

The cache engine is responsible for parsing the Predefined Cache Description to HTTP request. The cache engine sends the request and receives the response. The cache engine saves the response to the Cache DB.

Figure 5:
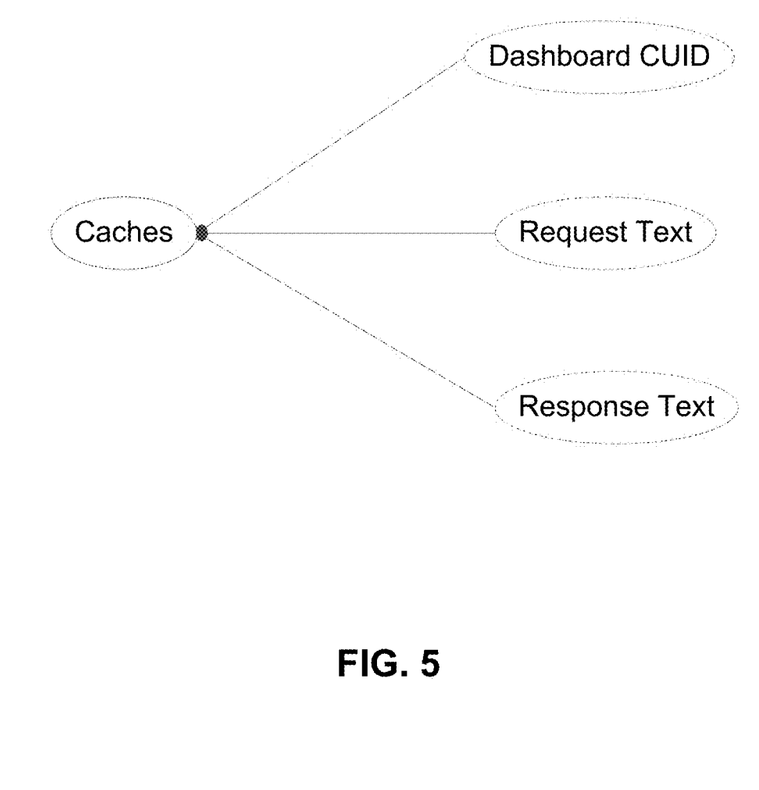
FIG. 5 shows specific aspects of one embodiment of a cache database.

Specific aspects of one embodiment of a Cache DB are now described in connection with FIG. 5 and with reference to FIG. 2. The Cache DB 208 is a SQLite database in the iPad.

The dashboard cluster unique identifier (CUID) and request text is the combination key of a table. It could determine a response text.

The Cache Engine will write to the database with the dashboard CUID, request text, response text. Dashboard runtime 210 will read response text from the database DB by dashboard CUID and request text.

Various embodiments can provide one or more of the following benefits. One potential benefit is enhanced reliability of interaction with database information. In particular, by selectively storing data in a cache memory of a mobile device, the user is assured of being able to access that data, even if connectivity to the remote database is lost.

Figure 6:
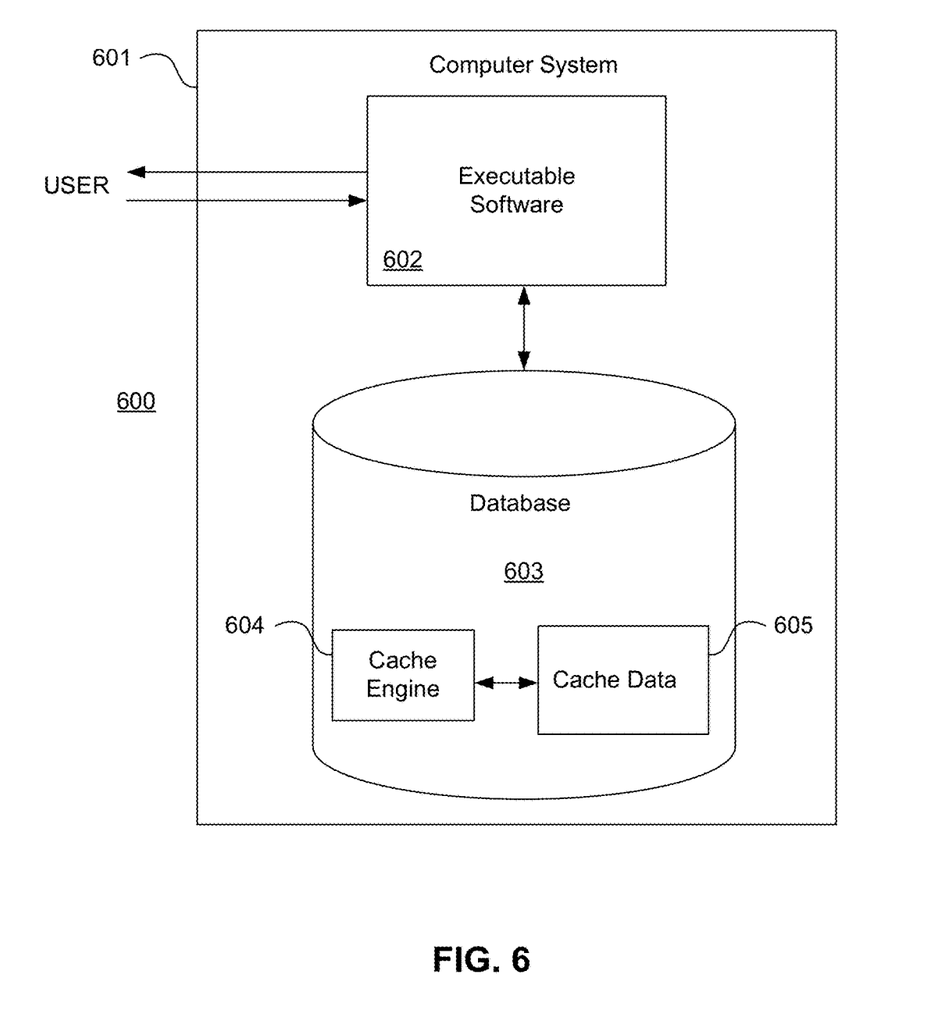
FIG. 6 illustrates hardware of a special purpose computing machine configured to perform data caching according to an embodiment.

FIG. 6 illustrates hardware of a special purpose computing machine configured to perform data caching according to an embodiment. In particular, computer system 600 comprises a processor 602 that is in electronic communication with a non-transitory computer-readable storage medium 603. This computer-readable storage medium has stored thereon code 605 corresponding to data stored in the cache. Code 604 corresponds to a cache engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
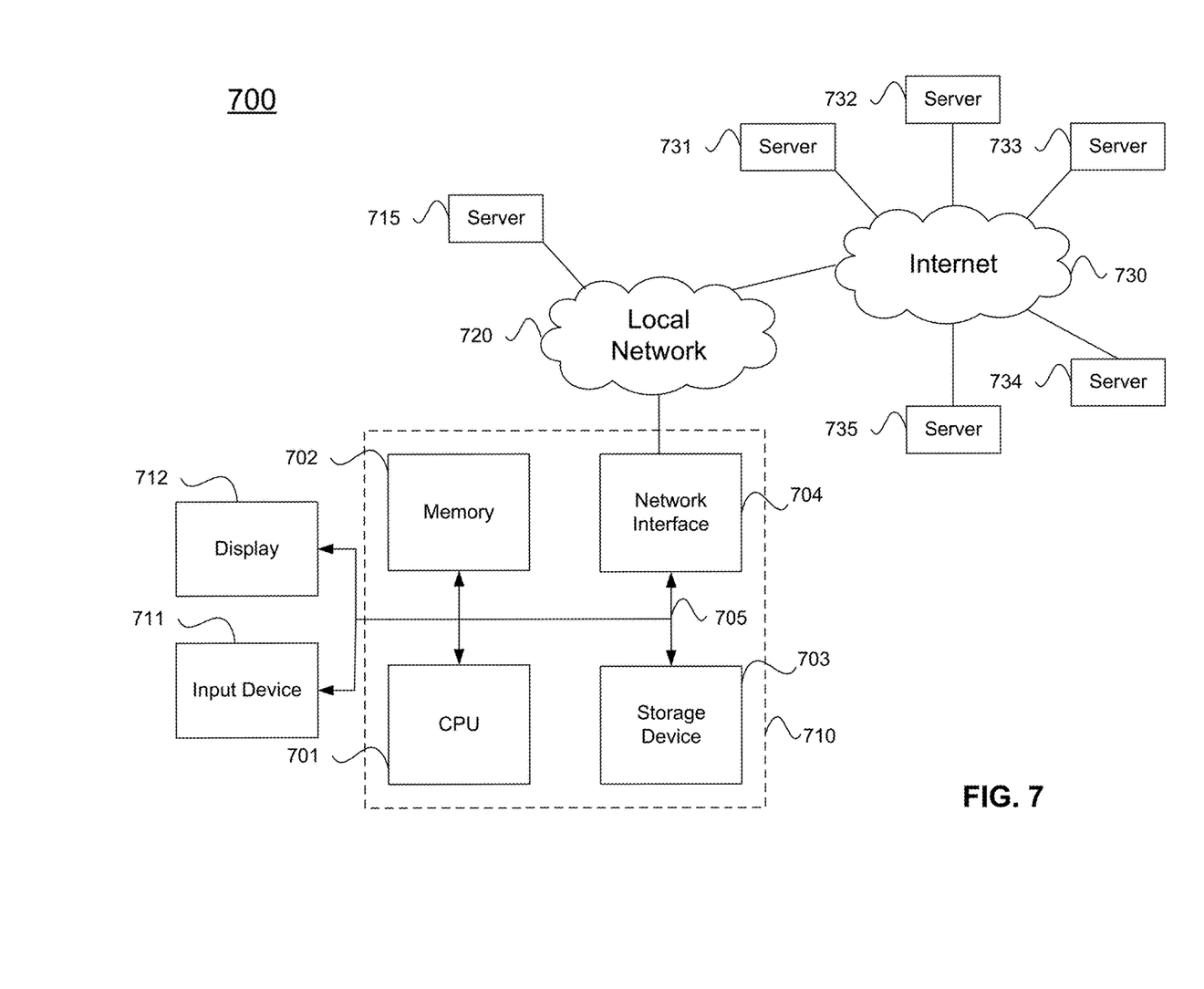
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 804 coupled with bus 805. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   providing a device comprising a cache engine and a cache memory;
   causing the cache engine to communicate a query including a cache parameter over a network connection to a remote database;
   causing the cache engine to receive data of a query result over the network connection;
   causing the cache engine to store in the cache memory according to the cache parameter, only a subset of data of the query result; and
   causing the device to display to a user, a dashboard including the subset of data of the query result stored in the cache memory.

2. A method as in claim 1 wherein the device comprises a mobile device.

3. A method as in claim 1 wherein the dashboard displays the data of the query result stored in the cache memory when the network connection is unavailable.

4. A method as in claim 1 further comprising offering the cache parameter for selection by the user.

5. A method as in claim 1 wherein the cache parameter comprises a data size limitation.

6. A method as in claim 1 wherein the cache parameter comprises a temporal limitation.

7. A method as in claim 1 wherein the cache parameter comprises a magnitude limitation.

8. A non-transitory computer readable storage medium embodying a computer program for performing a method, said method comprising:
   providing a device comprising a cache engine and a cache memory;
   causing the cache engine to communicate a query including a cache parameter over a network connection to a remote database;
   causing the cache engine to receive data of a query result over the network connection;
   causing the cache engine to store in the cache memory according to the cache parameter, only a subset of data of the query result; and
   causing the device to display to a user, a dashboard including the subset of data of the query result stored in the cache memory.

9. A non-transitory computer readable storage medium as in claim 8 wherein the device comprises a mobile device.

10. A non-transitory computer readable storage medium as in claim 8 wherein the dashboard displays the data of the query result stored in the cache memory when the network connection is unavailable.

11. A non-transitory computer readable storage medium as in claim 8 wherein the method further comprises offering the cache parameter for selection by the user.

12. A non-transitory computer readable storage medium as in claim 8 wherein the cache parameter comprises a data size limitation.

13. A non-transitory computer readable storage medium as in claim 8 wherein the cache parameter comprises a temporal limitation.

14. A non-transitory computer readable storage medium as in claim 8 wherein the cache parameter comprises a magnitude limitation.

15. A computer system comprising:
    one or more hardware processors of a mobile device;
    a software program, executable on one of said hardware processors, the software program configured for:
    causing a cache engine of the mobile device to communicate a query including a cache parameter over a network connection to a remote database;
    causing the cache engine to receive data of a query result over the network connection;
    causing the cache engine to store in the cache memory according to the cache parameter, only a subset of data of the query result; and
    causing the mobile device to display to a user, a dashboard including the subset of data of the query result stored in the cache memory.

16. A computer system as in claim 15 wherein the dashboard displays the data of the query result stored in the cache memory when the network connection is unavailable.

17. A computer system as in claim 15 wherein the software program is further configured to offer the cache parameter for selection by the user.

18. A computer system as in claim 15 wherein the cache parameter comprises a data size limitation.

19. A computer system as in claim 15 wherein the cache parameter comprises a temporal limitation.

* * * * *